(12) United States Patent
Fernandes

(10) Patent No.: US 7,580,855 B2
(45) Date of Patent: Aug. 25, 2009

(54) COMPUTER-IMPLEMENTED APPARATUS AND METHOD FOR GENERATING A TAILORED PROMOTION

(75) Inventor: Richard Fernandes, Norwalk, CT (US)

(73) Assignee: Webloyalty.com, Norwalk, CT (US)

( * ) Notice: Subject to any disclaimer, the term of this patent is extended or adjusted under 35 U.S.C. 154(b) by 2501 days.

(21) Appl. No.: 09/514,946

(22) Filed: Feb. 28, 2000

(65) Prior Publication Data

US 2003/0040958 A1    Feb. 27, 2003

(51) Int. Cl.
*G06Q 30/00* (2006.01)
(52) U.S. Cl. ........................................................ 705/14
(58) Field of Classification Search .................. 705/1, 705/14, 26, 27
See application file for complete search history.

(56) References Cited

U.S. PATENT DOCUMENTS

| 6,055,573 | A * | 4/2000 | Gardenswartz et al. | 709/224 |
| 6,285,987 | B1 * | 9/2001 | Roth et al. | 705/27 |
| 2002/0010668 | A1 * | 1/2002 | Travis et al. | 705/35 |

OTHER PUBLICATIONS

"Net issue gains steam privacy: industry acts ahead of FTC hearings next week", Jun. 4, 1997, San Jose Mercury News, Business section, p. 1C.*

* cited by examiner

*Primary Examiner*—Jeffrey D Carlson
(74) *Attorney, Agent, or Firm*—Rothwell, Figg, Ernst & Manbeck

(57) ABSTRACT

A computer-implemented electronic commerce apparatus and method is provided. The apparatus includes a connection to the distributed communication network and a consumer information storage, the consumer information storage including a consumer identifier storage, at least one site identifier, and including for each site a consumer identifier activity information pertaining to visited websites, wherein the electronic commerce apparatus receives the activity information, stores the activity information in the consumer information storage, and uses the activity information to create a tailored promotion and to present the tailored promotion to the consumer upon the consumer's visit to a second website. One embodiment of the method includes the steps of obtaining an activity information of a consumer when the consumer visits a first website, storing consumer preference information contained in the activity information, receiving a consumer web request for a second website, creating a tailored promotion for the consumer from the preference information, and presenting the tailored promotion to the consumer at the second website.

13 Claims, 4 Drawing Sheets

COMPUTER-IMPLEMENTED APPARATUS AND METHOD FOR GENERATING A TAILORED PROMOTION

BACKGROUND OF THE INVENTION

1. Field of the Invention

The present invention relates generally to a tailored promotion presented to a prospective customer, and more particularly to a tailored promotion presented to a prospective customer at an electronic commerce site.

2. Description of the Background Art

Electronic commerce is the transaction of commerce through an electronic medium, such as a distributed communication network. A common such network is the Internet, but may also include other common digital and computer networks such as a local area network (LAN), wide-area network (WAN), or a virtual private network (VPN), for example. As the most widespread and popular distributed communication network, the Internet will be used in all further discussion.

The Internet has become very popular for electronic commerce, with merchants electronically advertising and selling a wide variety of goods and services. The Internet has also proven to be a valuable tool for advertising and for building name or brand recognition, and therefore for establishing or increasing market share.

Current statistics show that electronic commerce is growing at a very rapid pace, and appears to be on track to achieve a respectable share of the total market in goods and services. Current estimates are that over 70 million Americans have Internet access, with this number projected to soon reach about 150 million. As a result, Internet advertising revenues reached $1.92 billion in 1998, and are expected to continue growing at a substantial rate.

Several traditional marketing approaches exist. In one traditional approach, a merchant may simply display goods and services on an electronic commerce site and simply wait for prospective customers to happen across the site.

Another traditional approach is the marketing promotion. Traditional marketing promotions generally operate on an assembly line approach. They generate a one-size-fits-all advertising theme and campaign, and aim the message at a large pool of prospective customers. The traditional approach works on the theory that if enough people receive the message, an acceptable percentage will be receptive and purchase the advertised goods and services. This is reflected on the Internet by so-called banner ads, that typically reside on a website and are displayed to all viewers of the website.

The assembly line approach works, but is not terribly efficient. First, by broadcasting a message to all available recipients, the traditional approach risks offending prospective customers by subjecting them to advertising campaigns on a large number of items they are not interested in. Second, by simply cranking out a uniform message to a large mass, the traditional approach is distracted from and overlooks smaller groups of likely and receptive prospects. Third, the assembly line approach may involve extra cost in targeting and reaching large numbers of unreceptive persons.

There remains a need in the art, therefore, for improvements in electronic commerce to present a tailored promotion to a visitor to an electronic commerce site.

SUMMARY OF THE INVENTION

A computer-implemented electronic commerce apparatus for generating a tailored promotion to a consumer over a distributed communication network is provided according to a first aspect of the invention. The electronic commerce apparatus comprises a connection to the distributed communication network and a consumer information storage, the consumer information storage including a consumer identifier storage, at least one site identifier, and including for each site a consumer identifier activity information pertaining to visited websites, wherein the electronic commerce apparatus receives the activity information, stores the activity information in the consumer information storage, and uses the activity information to create a tailored promotion and to present the tailored promotion to the consumer upon the consumer's visit to a second or subsequent website.

A computer-implemented electronic commerce method for generating a tailored promotion to a consumer over a distributed communication network is provided according to a second aspect of the invention. The electronic commerce method comprises the steps of obtaining an activity information of a consumer when the consumer visits a first website, storing consumer preference information contained in the activity information, receiving a consumer web request for a second website, creating a tailored promotion for the consumer from the preference information, and presenting the tailored promotion to the consumer at the second website.

A computer-implemented electronic commerce method for generating a tailored promotion to a consumer over a distributed communication network is provided according to a third aspect of the invention. The electronic commerce method comprises the steps of storing a consumer identifier contained in an activity information of the consumer, storing a website identifier for each website stored in the activity information, storing a web pages visited information, if any, for each website, storing a products reviewed information, if any, for each website, storing a purchases made information, if any, for each website, receiving a consumer web request for a second website, creating a tailored promotion for the consumer from the preference information, and presenting the tailored promotion to the consumer at the second website.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 1:
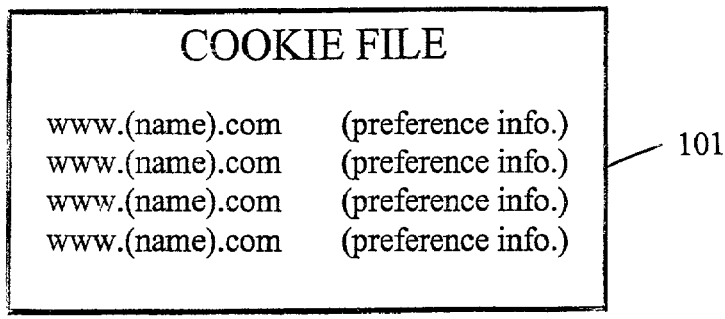
FIG. 1 shows a cookie file of a type commonly created and used by an Internet browser.

FIG. 1 shows a cookie file 101 of a type commonly created and used by an Internet browser. Users on the Internet typically use a browser to move between websites on the World Wide Web. A browser is simply a software package that interfaces with the Internet to send and receive data and to allow users to easily move between websites. When a user wants to go to a certain website, he or she merely enters an address or clicks on a link. A web request is transmitted to the specified website, and the website responds by transmitting back the data that forms the specified website page (i.e., web page) on the requester's computer.

A cookie file is a file on a user's computer that can be used by visited websites (i.e., requested websites) to store information on the user's computer. Each website that a user visits may therefore install data on the user's computer in the cookie file. The user does not see this transaction and does not know it is occurring. A website typically stores preference information in the cookie file, including particular user settings or configurations, registration information and passwords (if used or required by a website), on-line shopping cart data, activity information about the user's activities on the website, etc. A cookie file is therefore used by a website to store information about the user for future reference. Not only that, but a website may extract further information such as buying habits and preferences for certain goods and services.

Figure 2A:
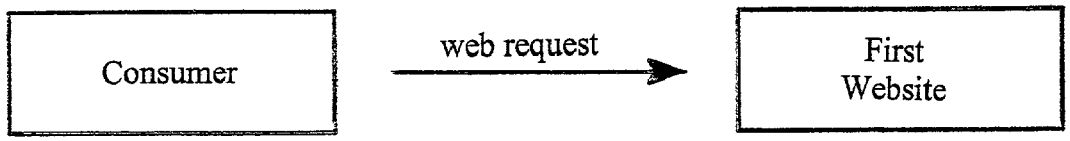
FIGS. 2A-2D show basic operations in the creation and maintenance of a cookie file.

FIGS. 2A-2D show basic operations in the creation and maintenance of a cookie file. In FIG. 2A, a consumer sends a web request to a first website. This may be done on typical browsers by entering a website address or by clicking on a link. A message is thereby sent to the first website, requesting a data transfer of information at the specified address and web page.

Figure 2B:
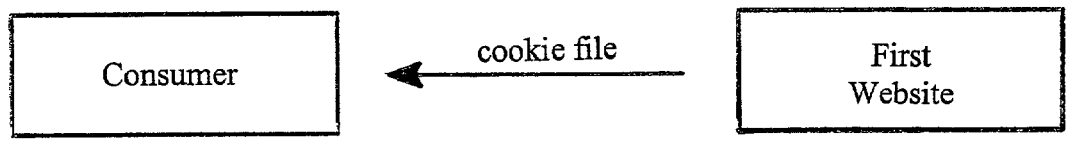

In FIG. 2B the first website transmits a response. The response may include an entry to be inserted into the cookie file on the consumer's computer (however, not all websites do so). The consumer does not see this transaction and does not participate in any way.

Figure 2C:
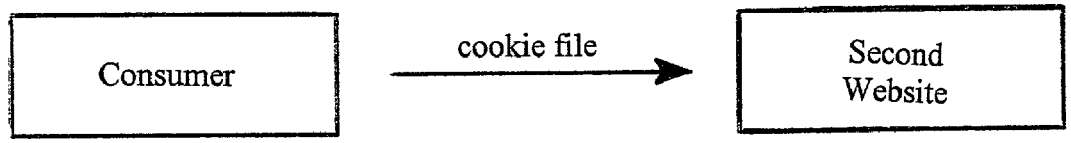

In FIG. 2C, when the consumer visits a second website, the second website may also request the cookie file.

Figure 2D:
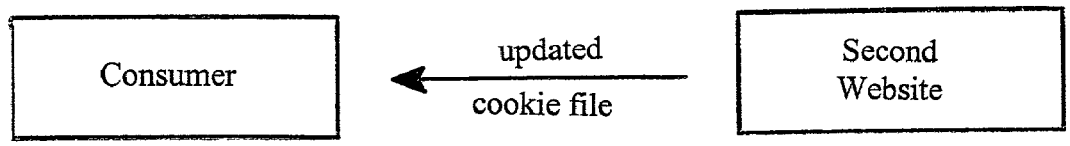

In FIG. 2D, the second website may update the cookie file on the consumer's computer by placing a new entry (or updating an existing one) in the cookie file. Of course, the first website may also update its own previous entry or may add new entries. In this manner, any website visited by the consumer may store information for future use by the website.

Figure 3:
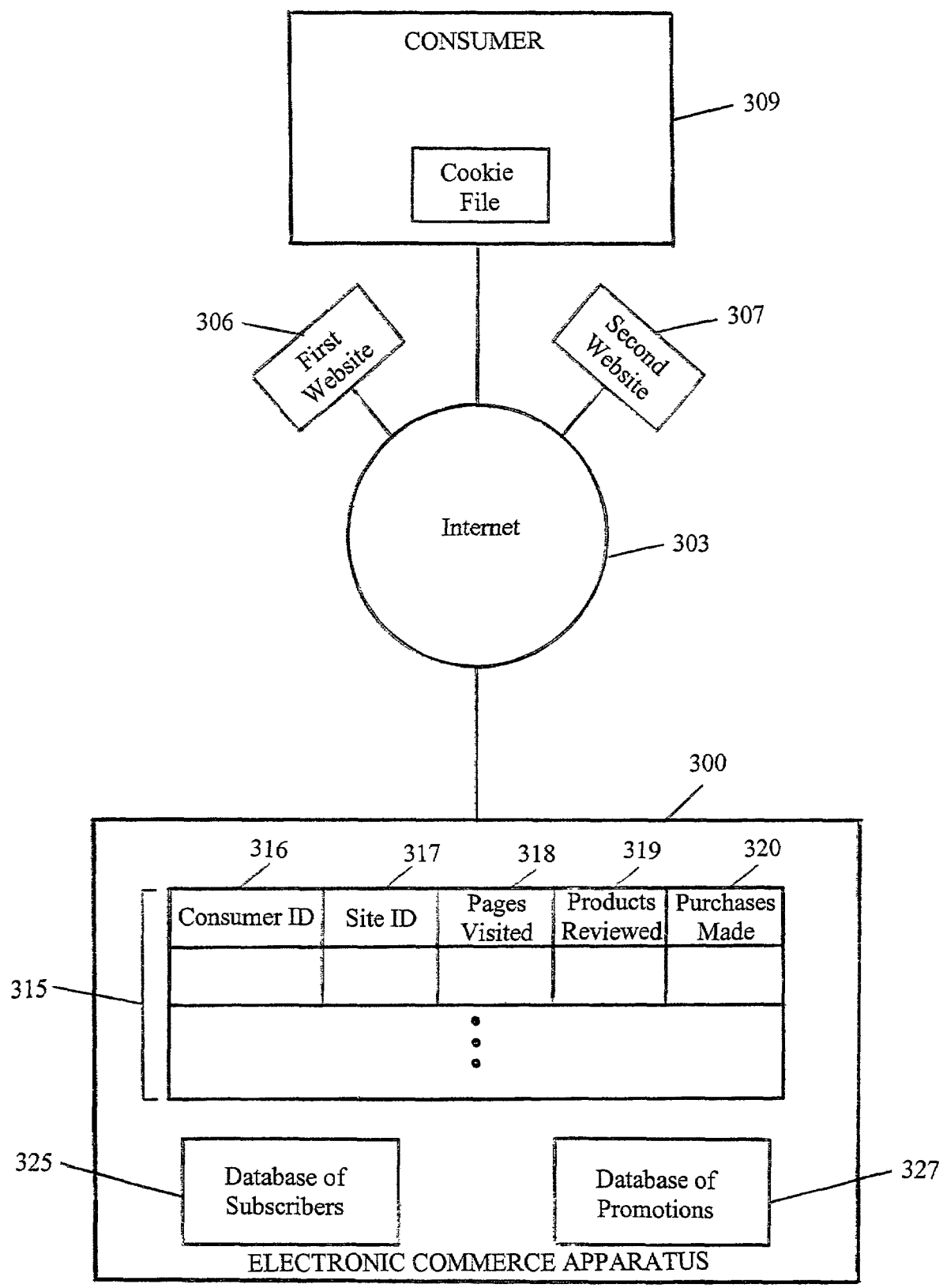
FIG. 3 shows a computer-implemented electronic commerce apparatus 300 of the present invention.

FIG. 3 shows a computer-implemented electronic commerce apparatus 300 of the present invention. The apparatus 300 is connected to a distributed communications network, such as the Internet 303. The Internet 303 may be additionally connected to any number of websites, such as a first website 306 and a second website 307, and may be connected to any number of consumers 309. The apparatus 300 may therefore communicate with other users and other computers connected to the Internet 303.

The computer-implemented electronic commerce apparatus 300 may include a consumer information storage 315, a database of subscribers 325, and a database of promotions 327. The consumer information storage 315 may include, for each consumer stored on the electronic commerce apparatus 300, a consumer identifier storage 316, a site visited identifier 317, a site pages visited storage 318, a products reviewed storage 319, and a purchases made storage 320, zip code or other address information, The consumer information storage 315 contains one or more entries, corresponding to one or more consumers. The consumer information storage 315 may be constructed to expand greatly to accommodate new entries as more consumer preference information is gathered. One complete entry is shown for the purpose of illustration.

The consumer identifier storage 316 may contain an identifier unique to each consumer stored on the electronic commerce apparatus 300. The identifier may be assigned, or may be an identifier that was given by the website that created the original cookie file entry.

The site visited identifier 317 may be an identifier given to each visited website. Each consumer may have multiple site visited identifiers 317 reflecting all sites visited by the particular consumer.

The site pages visited storage 318 may record all web pages on a website that have been visited by the particular consumer. The site pages visited storage 318 may also include information such as a number of repeat visits, dwell time on each page, etc.

The products reviewed storage 319 may contain information on offered goods and services reviewed by the consumer. If the consumer has been looking around at information on new car models, for example, that information may be present in the products reviewed storage 319 and could be used to infer that the consumer is interested in buying a new car.

The purchases made storage 320 may contain information on goods and services purchase by the consumer. This information likewise may be used to tailor a promotion to a consumer.

The database of subscribers 325 may contain all subscribers for whom the electronic commerce apparatus 300 may create a tailored promotion. An advertiser subscriber may retain the electronic commerce apparatus 300 to generate and present promotions to visitors to the subscriber's website, with such a promotion targeted to the particular consumer's likes and needs. Therefore, a subscriber may more efficiently employ promotions, and may increase sales, as visitors to the subscriber's website may only receive promotions that are tailored to his or her desires and needs.

The database of promotions 327 may contain all goods and services which a particular subscriber offers. The database of promotions 327 may therefore be used to tailor a promotion to each visitor to a website of a particular subscriber.

Figure 4:
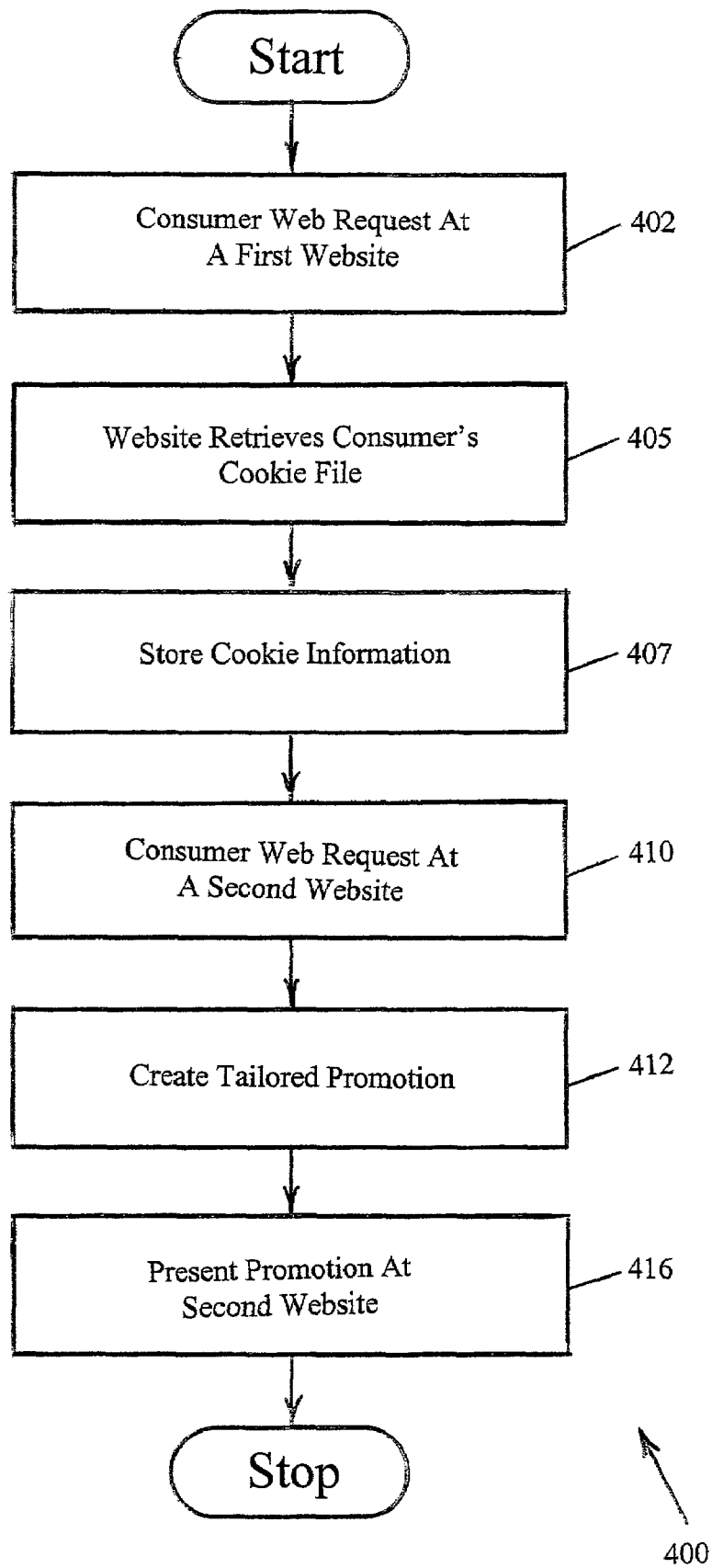
FIG. 4 shows a flowchart of a first embodiment of a method of the present invention.

FIG. 4 shows a flowchart 400 of a first embodiment of a method of the present invention. In step 402, a consumer web request is received at a first website. The first website may or may not be participating in a tailored promotion with the electronic commerce apparatus 300.

In step 405, in response to the consumer's web request, the first website retrieves the consumer's cookie file from the consumer's computer.

In step 407, the first website stores the preference information received from the consumer's computer.

In step 410, the electronic commerce apparatus 300 detects a consumer web request at a second website that is a subscriber of the electronic commerce apparatus 300. The electronic commerce apparatus 300 may thereupon generate a tailored promotion (assuming that the consumer has a cookie file). The electronic commerce apparatus puts the cookie on the user's file and shares the cookie across websites.

In step 412, the electronic commerce apparatus 300 may generate a tailored promotion using preference information from the consumer's cookie file. The promotion may offer goods or services that the consumer is receptive to, based on the preference information.

In step 416, the electronic commerce apparatus 300 presents the tailored promotion to the consumer, at the second website. The second website is preferably a subscriber of the electronic commerce apparatus 300. The electronic commerce apparatus also stores results of the promotions for consumers, which information also can be used to tailor additional promotions.

Figure 5:
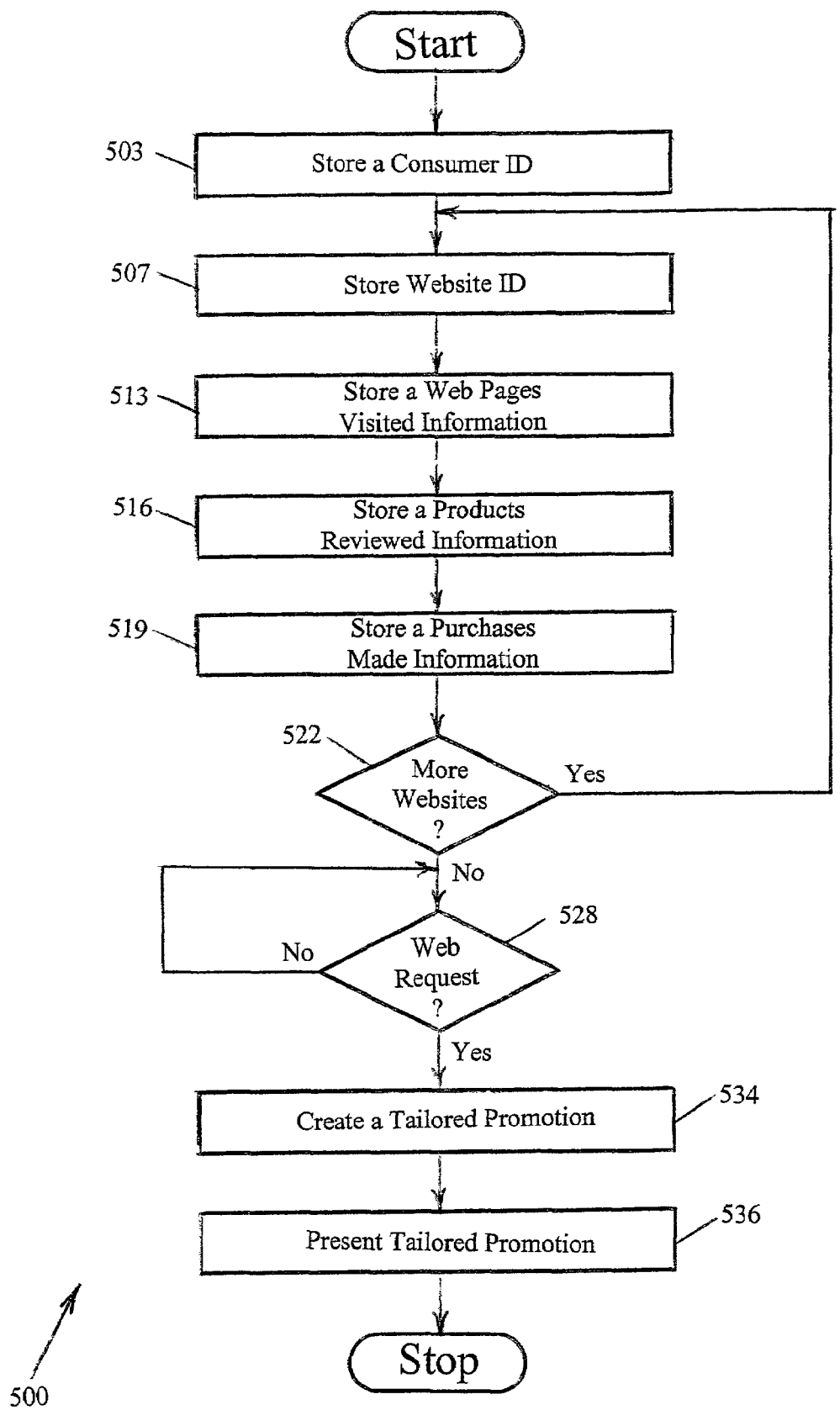
FIG. 5 shows a flowchart of a second embodiment of the method of the present invention.

FIG. 5 shows a flowchart 500 of a second embodiment of the method of the present invention. In step 503, the electronic commerce apparatus 300 stores a consumer identifier received from a cookie file. The cookie file may have been acquired through a web request from a consumer, may be obtained through a list purchase of cookie file information from a dealer in such information, or in other ways. The apparatus enables adaptive use of the collected data as time goes on, by analyzing the consumer's behavior as reflected in the data accumulated in the cookie files.

In step 507, the electronic commerce apparatus 300 stores a website identifier for each website visited by the consumer.

In step 513, the electronic commerce apparatus 300 stores a web pages visited information for all recorded web pages visited by the consumer at each website (i.e., each consumer may have visited multiple pages on a website and may have visited multiple websites).

In step 516, the electronic commerce apparatus 300 stores information regarding goods and services reviewed by the consumer. Additionally, the electronic commerce apparatus 300 may record statistics such as the time spent looking at a particular good or service, price range of reviewed product, type of reviewed product, etc.

In step 519, the electronic commerce apparatus 300 stores information regarding purchases of goods and services. The purchase information may be useful in predicting future purchases and may be useful in presenting tailored promotions.

In step 522, for a particular consumer, if more websites visited information exists, the method branches back to step 507. Else, the method proceeds to step 528.

In step 528, the method waits for a subscriber website to receive a web request. It should be understood that although steps 528-536 are shown as occurring after steps 503-522, steps 528-536 occur independently and may occur at any time in relation to steps 503-522. If a web request is received, the method proceeds to step 534, and the subscriber website sends to the electronic commerce apparatus the consumer ID of the requester.

In step 534, a tailored promotion is created from stored preference information (if any) of the consumer as indicated by the consumer ID transmitted to the electronic commerce apparatus by the website.

In step 536, the tailored promotion is transmitted by the electronic commerce apparatus to the subscriber website, where it is presented to the consumer at the subscriber website.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computer-implemented electronic commerce apparatus for generating a tailored promotion of goods and/or services offered by a subscriber to said apparatus based on personal consumer preferences for presentation by said subscriber to a consumer over a distributed communication network, comprising:
    a connection to said distributed communication network;
    a database of goods and/or service promotion data pertaining to goods and/or services offered by subscribers to said apparatus; and
    a consumer information storage, said consumer information storage including a consumer identifier storage for storing consumer identifier information identifying individual consumers, and including for each stored consumer identifier activity information pertaining to network sites accessed by said individual consumers and associated with individual consumers;
    wherein said electronic commerce apparatus receives said activity information, stores said activity information in said consumer information storage by individual consumer, receives from a particular subscriber network site consumer identifier information associated with a consumer requesting access to that subscriber network site, uses said stored activity information in conjunction with said goods and/or services promotion data in said database to create a tailored promotion of goods and/or services offered by said particular subscriber network site in response to said received consumer identifier information, and transmits said tailored promotion to said particular subscriber network site for presentation to said consumer.

2. The computer-implemented electronic commerce apparatus of claim 1, further including a database of subscribers to said tailored promotion.

3. The computer-implemented electronic commerce apparatus of claim 2, wherein said particular network site is a subscriber and is listed in said database of subscribers.

4. The computer-implemented electronic commerce apparatus of claim 1, wherein said distributed communication network is the Internet.

5. The computer-implemented electronic commerce apparatus of claim 1, wherein said activity information is obtained from a cookie file stored on said consumer's computer.

6. The computer-implemented electronic commerce apparatus of claim 1, wherein said activity information includes a pages visited information.

7. The computer-implemented electronic commerce apparatus of claim 1, wherein said activity information includes a products and services reviewed information.

8. The computer-implemented electronic commerce apparatus of claim 1, wherein said activity information includes a purchases made information.

9. The computer-implemented electronic commerce apparatus of claim 1, wherein said electronic commerce apparatus receives said activity information from a consumer's computer upon a visit by said consumer to a first network site.

10. A method for presenting to a consumer over a distributed communication network a promotion tailored to the consumer's personal preferences of particular goods and/or services offered by a subscriber having a site on said network, comprising the steps of:
    storing consumer identifier information uniquely identifying an individual consumer;
    receiving from a plurality of different network sites on said distributed communication network, consumer activity information associated with consumer identification information, said consumer activity information including network site identifier information identifying the network site transmitting the activity information, and information pertaining to goods and/or services offered by said network site that have been accessed and/or purchased by a consumer associated with said consumer identification information;
    storing said consumer activity information in association with stored consumer identification information;
    storing a database containing various promotions of goods and/or services offered by a plurality of subscriber network sites;
    receiving from a first subscriber network site consumer identifier information of a consumer requesting access to said first subscriber network site;
    creating a tailored promotion of specific goods and/or services offered by said first subscriber network site to be presented to said requesting consumer in accordance with stored consumer activity information associated with the consumer identifier information received from said first subscriber network site; and transmitting said tailored promotion to said first subscriber network site to be displayed to said requesting consumer over said distributed communication network.

11. The method of claim 10, wherein said consumer identifier information is stored as a cookie on a computer of the consumer identified by the consumer identifier information.

12. The method of claim 10, wherein said plurality of network sites providing consumer activity information include non-subscriber network sites.

13. The method of claim 10, wherein said distributed communication network comprises the Internet.

* * * * *